United States Patent
Bennett

[15] 3,695,204
[45] Oct. 3, 1972

[54] POWER BOAT WITH TRIM TABS

[72] Inventor: Charles H. Bennett, 20400 Nine Mile Road, St. Clair Shores, Mich. 48080

[22] Filed: Sept. 17, 1970

[21] Appl. No.: 73,166

[52] U.S. Cl. ............................................. 114/66.5 P
[51] Int. Cl. .................................................. B63b 1/28
[58] Field of Search ....... 114/66.5 P; 244/83 E, 83 B, 244/83 C

[56] References Cited

UNITED STATES PATENTS 2,397,978  4/1946  Paulus et al. .............. 244/83 E
3,468,278  9/1969  Kercheval .............. 114/66.5 P

*Primary Examiner*—Andrew H. Farrell
*Attorney*—Barnes, Kisselle, Raisch & Choate

[57] ABSTRACT

A boat with a pair of trim tabs adjustably mounted thereon and control means for changing the orientation of each trim tab with respect to the boat independently of the other. The control means includes a single actuator which is operable in one plane to simultaneously move both trim tabs, in another plane to move one trim tab and in a third plane to move the other trim tab. An indicia plate is associated with the control means to orient the control means with respect to the boat.

9 Claims, 6 Drawing Figures

INVENTOR.
CHARLES H. BENNETT
BY
Barnes, Kisselle, Raisch & Choate
ATTORNEYS

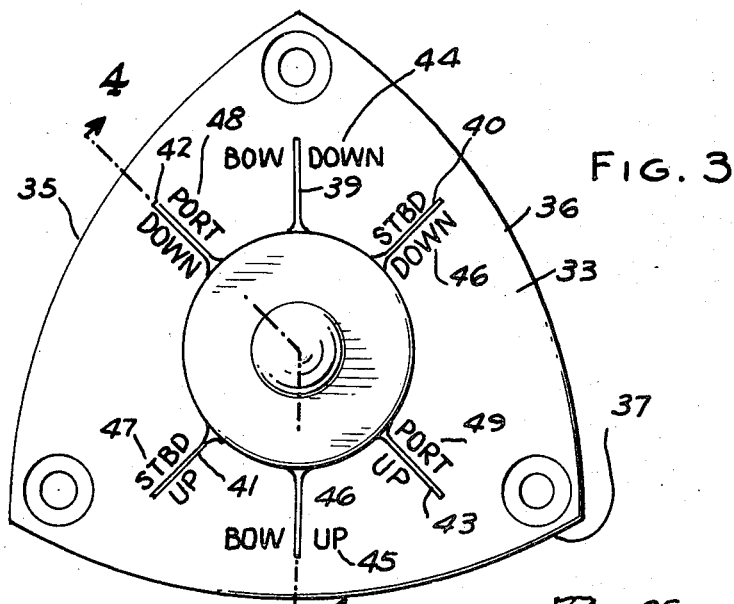
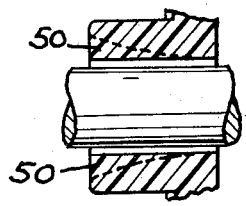
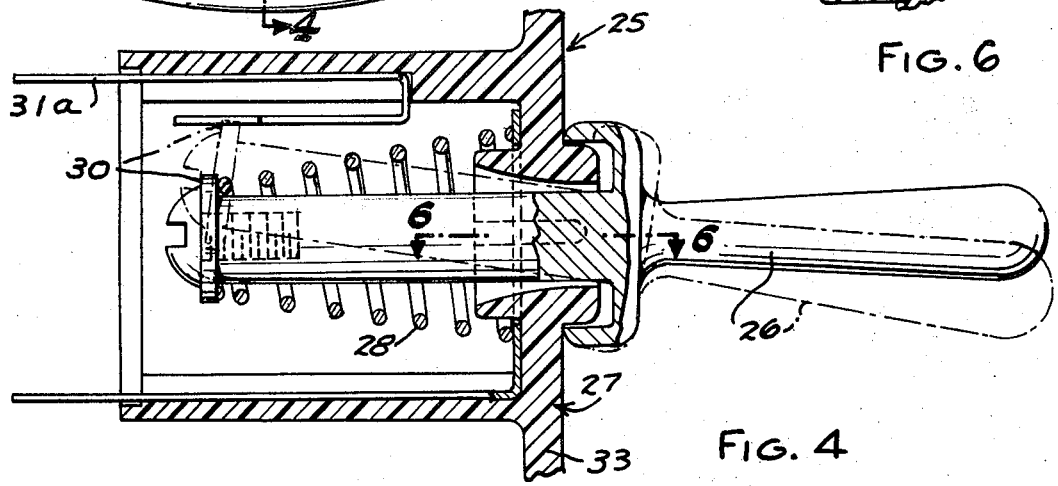
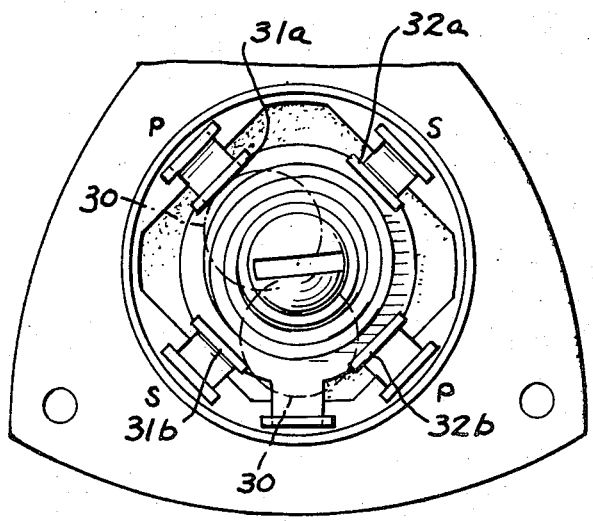
FIG. 3
FIG. 6
FIG. 4
FIG. 5
INVENTOR.
CHARLES H. BENNETT
BY
Barnes, Kisselle, Raisch & Choate
ATTORNEYS

POWER BOAT WITH TRIM TABS

This invention relates to power boats and particularly to power boats equipped with trim tabs.

BACKGROUND OF THE INVENTION

In my prior U.S. Pat. Nos. 3,062,167, issued Nov. 6, 1962; 3,111,103, issued Nov. 19, 1963; and 3,399,643, issued Sept. 3, 1968, entitled "Trim Attachment for Power Boats", there is disclosed and claimed a trim attachment for power boats particularly adapted for power boats having a keel line which varies in inclination to the chine line and wherein the trim attachment comprises a pair of trim members which are hinged to the stern of the boat about transverse axes. The trim tabs are utilized to provide longitudinal and lateral trimming of the boat under varying loads and sea conditions. Heretofore individual controls or actuators have been provided for each trim tab and considerable confusion has been created where the boat owner or operator connects the switches or controls to move the trim tab and change its orientation with respect to the boat both in whether the trim tab control should be moved forward or backward to raise and lower the trim tabs as well as in the fact that there are two controls which under stress or adverse conditions might be erroneously actuated.

Accordingly, among the objects of the invention are to provide a control means which includes a single actuator for controlling both the trim tabs individually or together.

SUMMARY OF THE INVENTION

A boat with a pair of trim tabs adjustably mounted thereon and control means for changing the orientation of each trim tab with respect to the boat independently of the other. The control means includes a single actuator which is operable in one plane to simultaneously move both trim tabs, in another plane to move one trim tab and in a third plane to move the other trim tab. An indicia plate is associated with the control means to orient the control means with respect to the boat.

DESCRIPTION OF THE DRAWINGS

FIG. 3 is a sectional view of the actuator for the control means for the boat;

FIG. 4 is a plan view of the indicia plate for the actuator.

FIG. 5 is a rear end view of the control means.

FIG. 6 is a fragmentary sectional view taken along the line 6—6 in FIG. 3.

DESCRIPTION

Figure 1:
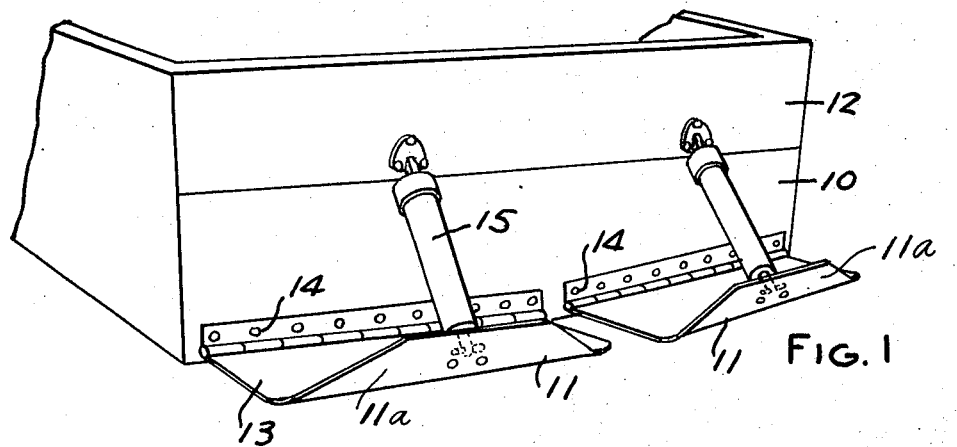
FIG. 1 is a fragmentary perspective view of a boat embodying the invention.
Figure 2:
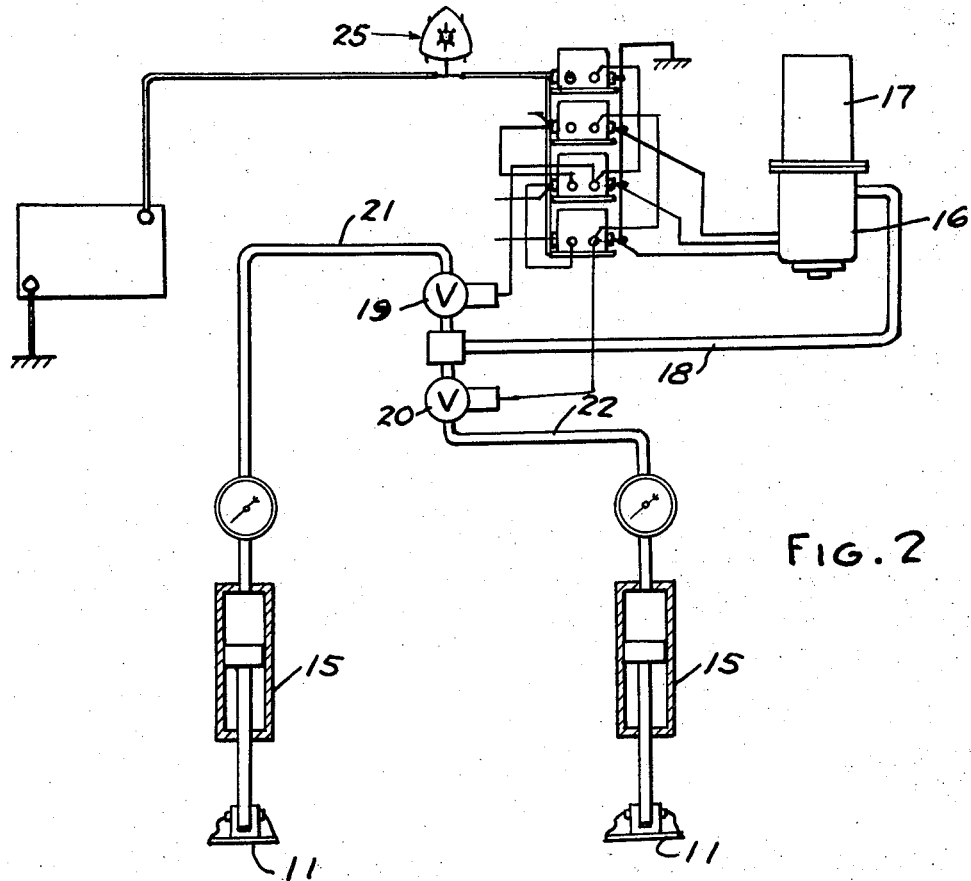
FIG. 2 is a schematic diagram of the control means for the boat.

Referring to FIG. 1, boat 10 has a pair of trim members 11 hinged to the transom 12 in the manner disclosed and claimed in the aforementioned U.S. Pat. Nos. 3,062,167 and 3,399,643. Each of the trim members comprises a generally flat portion 13 which is hinged to the transom by a hinge 14. Each member further includes an upstanding flange 11a. The underside of the trim member 11 when in horizontal position is substantially in the plane of the bottom 18 of the boat.

The angle of the trim member with respect to the boat can be varied by use of a hydraulic cylinder 15 which is pivoted to transom 12 and has its piston rod pivoted to trim member 11.

Referring to FIG. 4, the apparatus for controlling the flow of fluid to cylinders 15 comprises a pump 16 which receives fluid from a reservoir 17 and when energized in one direction supplies the fluid through a line 18 to solenoid operated valves 19, 20 controlling communication between the line 18 and line 21, 22 to each of the cylinders 11. When the pump 16 is operated in one direction, fluid is supplied to the cylinders 15, and when it is operated in the opposite direction, fluid is withdrawn from the cylinders 15 as the pistons force the fluid out of the cylinders.

It will be appreciated that by operating the pump in one direction or the other, a varying inclination to the trim members can be achieved in order to produce the desired trim of the boat as more fully set forth in the aforementioned United States patents.

In accordance with the invention, the solenoids 19, 20 for actuating the trim tabs 11 are connected to a single control 25 which includes an actuator or lever 26 that extends through an opening in a frame 27 and yieldingly urged to a neutral position by a coil spring 28 interposed between a washer 29 on the end thereof and frame 27. The lower end 30 of the lever is adapted to selectively engage contacts. When the lever 26 is moved in one plane corresponding to the fore and aft of the boat a pair of contacts 31, 32 is engaged at each end of the movement to simultaneously move the trim tabs in the same direction whether it is up or down. When the lever is moved in another plane at 45° to the fore-and-aft plane, contacts 32a, 31b are contacted at the extreme positions which control solenoid 19 that operates one of the trim tabs, namely the trim tab on the starboard side of the stern. When the control lever is moved in another plane at 90° to the second plane and 45° to the fore-and-aft plane, another pair of contacts 31a, 32b is contacted at the extremes of movement which control the solenoid 20 that operates the port stern trim tab. In practice, when contact is made with the contacts, relays are energized which control both energization of the pump 16 and selective energization of the solenoid operated valves 19, 20.

There is associated with the actuator an indicia plate 33 in the general form of a triangle as shown in FIG. 4 which has curved sides 35, 36, 37 simulating a shortened boat. The apex 38 of the plate 33 is mounted on the boat to correspond with the bow of the boat and indicia are provided in the form of lines 39, 40 and 40, 41 and 42, 43 to indicate the fore-and-aft plane, the second plane and the third plane. Further letters or labels 44, 45, 46, 47, 48, 49 are provided corresponding to the port and starboard trim tabs.

In order to prevent inadvertent contact an operation of both trim tabs when the lever is moved other than in a fore-and-aft plane, a stop 50 is provided which engages the lower end of the lever 26 and prevents movement sufficiently to engage the adjacent contacts (FIG. 6).

The term "general plane" as used herein is intended to indicate the fore-and-aft and side-to-side movement.

The structure and connections of the hydraulic and electrical systems are more clearly shown and described in my copending application Ser. No. 3,756, filed Jan. 19, 1970.

I claim:

1. The combination comprising
a boat having a bow and a stern,
a pair of trim tabs movably mounted on the stern of the boat,
operating means individual to each trim tab for changing the orientation of the trim tab with respect to the boat,
control means for simultaneously controlling both trim tab operating means and including a single actuator,
means for mounting the actuator for movement in at least three general planes with respect to the boat, namely, in a first fore and aft plane, in a second plane intersecting the fore-and-aft plane at an acute angle, and in a third plane intersecting the first plane at an acute angle,
means interconnecting each trim tab operating means with the control means such that fore-and-aft movement of the actuator simultaneously actuates the trim tabs to change the trim tab orientation in the same direction, movement of the actuator in the first plane actuates one of the trim tabs and movement of the actuator in the second plane actuates the other of the trim tabs, such that the movement of the actuator forwardly in the fore-and-aft plane operates both trim tabs in a direction to move the bow down and movement of the actuator rearwardly in the fore-and-aft plane operates both trim tabs in a direction to move the bow up, the movement of the actuator forwardly in the second plane operates one trim tab in a direction to move the starboard side of the boat down and movement rearwardly in the second plane operates said one trim tab in a direction to move the starboard side up, movement of the actuator forwardly in the third plane operates the other trim tab in a direction to move the port side of the boat down and movement of the actuator rearwardly in the third plane operates said other trim tab in a direction to move the port side up.

2. The combination set forth in claim 1 wherein said actuator is pivoted on said boat.

3. The combination set forth in claim 1 wherein said actuator functions to complete electrical circuits to said control means as it moves in said planes.

4. The combination set forth in claim 1 wherein said actuator is biased to return to a neutral position.

5. The combination set forth in claim 1 wherein an indicia plate is associated with said actuator and bears indicia indicating directions of said fore and aft plane and said second and third planes.

6. The combination set forth in claim 1 wherein said control means includes a pair of electrical contacts associated with the extreme position of said actuator as it moves in the fore-and-aft plane and a single electrical contact associated with the extremes of the movement of the lever in each of the second plane and the third plane,
said contacts being connected to the control means for the respective trim tabs.

7. The combination set forth in claim 1 wherein a generally triangular shaped indicia plate is associated with said actuator,
said plate being oriented with respect to the boat so that one apex of the triangle extends generally toward the bow of the boat,
each of the other apices lying generally in the second and third planes, respectively.

8. The combination set forth in claim 7 wherein said indicia plate includes indicia thereon indicating the fore and aft plane, the second plane and the third plane.

9. The combination comprising
a boat having a bow and a stern,
a pair of trim tabs movably mounted on the stern of the boat,
operating means individual to each trim tab for changing the orientation of the trim tab with respect to the boat,
control means for simultaneously controlling both trim tab operating means and including a single actuator,
means for mounting the actuator for movement in at least three general planes with respect to the boat, namely, in a first fore and aft plane, in a second plane intersecting the fore-and-aft plane at an acute angle, and in a third plane intersecting the first plane at an acute angle,
means interconnecting each trim tab operating means with the control means such that fore-and-aft movement of the actuator simultaneously actuates the trim tabs to change the trim tab orientation in the same direction, movement of the actuator in the first plane actuates one of the trim tabs and movement of the actuator in the second plane actuates the other of the trim tabs, such that the movement of the actuator forwardly in the fore-and-aft plane operates both trim tabs in a direction to move the bow down and movement of the actuator rearwardly in the fore-and-aft plane operates both trim tabs in a direction to move the bow up, the movement of the actuator forwardly in the second plane operates one trim tab in a direction to move the starboard side of the boat down and movement rearwardly in the second plane operates said one trim tab in a direction to move the starboard side up, movement of the actuator forwardly in the third plane operates the other trim tab in a direction to move the port side of the boat down and movement of the actuator rearwardly in the third plane operates said other trim tab in a direction to move the port side up,
said actuator being biased to return to a neutral position,
a generally triangular shaped indicia plate associated with said actuator,
said plate being oriented with respect to the boat so that one apex of the triangle extends generally toward the bow of the boat,
each of the other apices lying generally in the second and third planes, respectively,
said indicia plate having indicia thereon indicating the fore and aft plane, the second plane and the third plane.

* * * * *